(12) United States Patent
Staiman et al.

(10) Patent No.: US 8,490,152 B2
(45) Date of Patent: Jul. 16, 2013

(54) ENTITLEMENT LIFECYCLE MANAGEMENT IN A RESOURCE MANAGEMENT SYSTEM

(75) Inventors: Jeffrey A. Staiman, Bellevue, WA (US); Mark Wahl, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 12/911,752

(22) Filed: Oct. 26, 2010

(65) Prior Publication Data
US 2012/0102489 A1  Apr. 26, 2012

(51) Int. Cl.
*G06F 17/00* (2006.01)

(52) U.S. Cl.
USPC .............................................. 726/1; 713/167

(58) Field of Classification Search
USPC .......................................................... 713/167
See application file for complete search history.

(56) References Cited

U.S. PATENT DOCUMENTS

| | | | |
|---|---|---|---|
| 6,654,745 B2 | 11/2003 | Feldman | |
| 2005/0097353 A1 | 5/2005 | Patrick et al. | |
| 2005/0138061 A1 | 6/2005 | Kuehr-McLaren et al. | |
| 2005/0138412 A1 | 6/2005 | Griffin et al. | |
| 2006/0282392 A1 | 12/2006 | Ewert et al. | |
| 2008/0184336 A1 | 7/2008 | Sarukkai et al. | |
| 2008/0270174 A1 | 10/2008 | Schlesinger et al. | |
| 2009/0150981 A1* | 6/2009 | Amies et al. | 726/5 |
| 2011/0162034 A1* | 6/2011 | Nagaratnam et al. | 726/1 |

OTHER PUBLICATIONS

Martin, "Fine-grained entitlements—Next level Application Access Management", Retrieved at << http://www.icsynergy.com/martin/?p=199 >>, Retrieved Date:Jul. 22, 2010, pp. 6.

"Creating Entitlement Policies", Retrieved at << http://www.novell.com/documentation/designer30/admin_guide/?page=/documentation/designer30/admin_guide/data/bjfh6zu.html >>, Retrieved Date: Jul. 22, 2010, pp. 4.

* cited by examiner

*Primary Examiner* — Matthew Smithers

(57) ABSTRACT

An entitlement management system is described herein that models each entitlement as a resource within a resource management system. In a resource management system that applies policy to all requests to create, update, and delete a resource, this approach allows rich application of policy to the creation, delegation, renewal, expiration, and deletion of entitlements. A resource management system that can synchronize data to connected systems can thereby grant or revoke these permissions in those systems. This approach also facilitates role mining, attestation, and compliance reporting. Entitlements stored as resources may also include properties, such as workflows and policies related to the entitlements. Thus, the entitlement management system provides a more formal and automated facility for managing entitlements in organizations.

20 Claims, 3 Drawing Sheets

ENTITLEMENT LIFECYCLE MANAGEMENT IN A RESOURCE MANAGEMENT SYSTEM

BACKGROUND

Many organizations depend on large software environments for managing internal and external business data. For example, most corporations have a large databases and related applications for performing human resources functions, accounting, customer management, and so forth. These large environments often include many physical components, such as servers, as well as many software components, such as databases, client applications, backup and other administrative components, and so forth. Deployment and maintenance of large software environments consume a significant amount of time and effort spent by organizational information technology (IT) departments. One example of a large software environment is MICROSOFT™ Forefront Identity Manager (FIM) 2010 (and MICROSOFT™ Identity Lifecycle Manager (ILM) 2007 that preceded it). FIM provides an integrated and comprehensive solution for managing user identities and their associated credentials in an organization, including identity synchronization, certificate and password management, and user provisioning in a single solution that works across heterogeneous environments that allows IT departments to define and automate the processes used to manage identities from creation to retirement.

Organizations want to control what users can do to (or with) resources such as applications, file shares, printers, and SHAREPOINT™ sites which are under control of the organization, which can include 'on premise' resources directly managed by the organization, or resources 'in the cloud' which are managed by a service provider, and for which the organization has the ability to grant access to end users. Further, they want to do this in a way that is provably (i.e., via audit) consistent with their governance, risk and compliance (GRC) policies. An 'entitlement' is a logical expression which describes the affirmative intent of an organization, which controls a resource (or resource collection), to allow a user, or a collection of users, to take an action on that resource—such as create, read, update, delete, print, copy, upload, approve, or membership in a group, role, or set, which may have convey privileges in an application.

Organizations want to manage the lifecycle of entitlements: who is able to create entitlements to specific resources for specific users or collections of users; how long the entitlement endures before it is subject to renewal or expiration; and what happens upon the expiration of an entitlement. Additionally, they want the capability of analyzing existing and historical entitlements, in order to prove that their actual entitlements were consistent with their compliance policies; and to facilitate role mining (i.e., the collecting of similar users into roles). For example, an organization might want to model the policy, "every member of a compliance-tracked group has to request to renew their membership in that group every 6 months, and have that request approved by an owner of the group; or if not, that member shall be removed from the group."

Today, implementing entitlement lifecycles is a largely manual process. IT professionals may use scripts and other timesaving tools, but the decision-making around when and on which users and resources to invoke the scripts is largely handled manually or through loosely connected systems (e.g., a calendar reminder). This can lead to allowing users to have access to resources for longer than intended or long after a user changes role and should no longer have access. As users change jobs within an organization or leave organizations, eliminating unnecessary access to resources as quickly as possible reduces the likelihood of unintended access to resources.

SUMMARY

An entitlement management system is described herein that models each entitlement as a resource within a resource management system. In a resource management system that applies policy to all requests to create, update, and delete a resource, this approach allows rich application of policy to the creation, delegation, renewal, expiration, and deletion of entitlements. A resource management system that can synchronize data to connected systems can thereby grant or revoke these permissions in those systems. Although an entitlement is modeled as a resource by the resource management system, the system can translate the entitlement into whatever representation is expected by connected systems to which the data is synchronized. This approach also facilitates role mining, attestation, and compliance reporting. Entitlements stored as resources may also include properties, such as workflows and policies related to the entitlements. Thus, the entitlement management system provides a more formal and automated facility for managing entitlements in organizations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
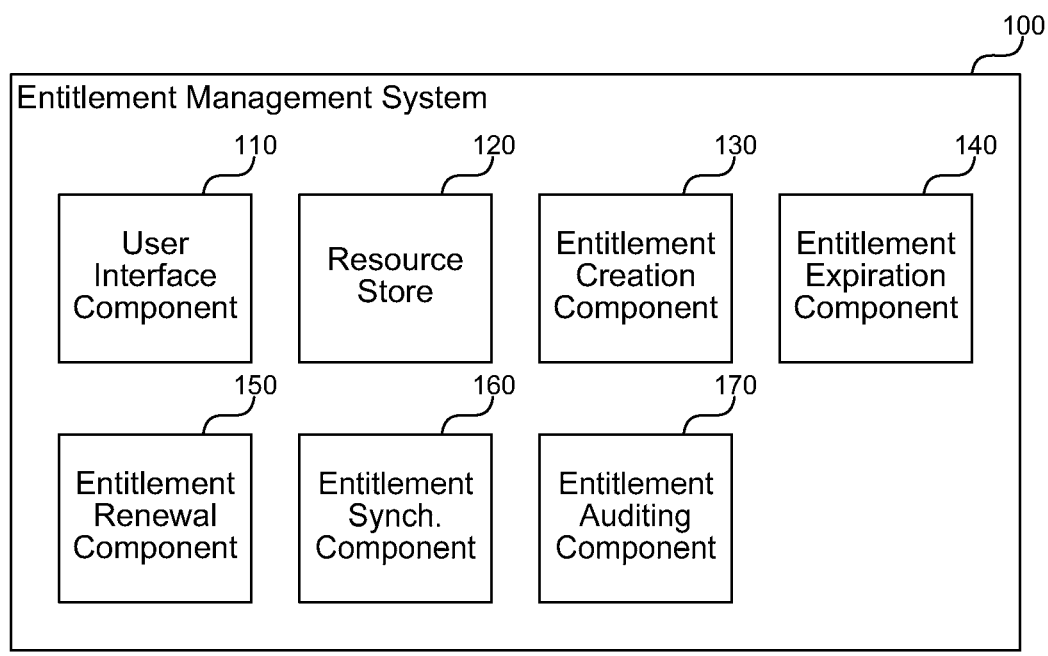
FIG. 1 is a block diagram that illustrates components of the entitlement management system, in one embodiment.

An entitlement management system is described herein that models each entitlement as a resource within a resource management system. In a resource management system that applies policy to all requests to create, update, and delete a resource, this approach allows rich application of policy to the creation, delegation, renewal, expiration, and deletion of entitlements. A resource management system that can synchronize data to connected systems can thereby grant or revoke these permissions in those systems. Although an entitlement is modeled as a resource by the resource management system, the system can translate the entitlement into whatever representation is expected by connected systems to which the data is synchronized. For example, the entitlement management system may have a resource that tracks information about a user's membership in a group; and the resource management system will provision the group with the right membership to Active Directory or some other system; and yet Active Directory will have no direct knowledge of the entitlement itself. This approach also facilitates role mining, attestation, and compliance reporting. Entitlements stored as resources may also include properties, such as workflows and policies related to the entitlements.

The entitlement management system can apply policy to the creation of an entitlement in a resource management system, based on properties of the requestor, the resource, the user, or collection of users to which the entitlement pertains, and other properties of the request. The system can also model delegation of an entitlement as an independent resource, including any persistence of the relationship to the delegated entitlement to the original grantor, and the policies that enable the creation of the delegated entitlement by the grantor. The system also applies policy updates, such as extension of an expiration date or deletion of an entitlement in a resource management system, based on the resource, the user(s) or role(s), creation date, applicable policies at creation, or other attributes of the entitlement. The system can model entitlements as having an expiration date, and revoke those entitlements if they are not renewed prior to the expiration date. Finally, the system can enumerate non-account entitlements in a resource management system based on properties of the entitlement, such as the resource, the user or role(s) to which the entitlement pertains, the expiration date, the policies that were applied to the entitlement, and/or the reason the entitlement was granted, to allow reporting and auditing of entitlements. Thus, the entitlement management system provides a more formal and automated facility for managing entitlements in organizations.

The entitlement management system models each user (or role) that is intended to have an account or a particular permission for a resource as a resource in the resource management system. The entitlement management system may be implemented within the resource management system by: 1) extending schema of the resource management system to include one or more "entitlement" resource types, 2) extending schema of the resource management system to include any new properties of the "entitlement" type(s) that are relevant for policy in their environment, 3) configuring the user interface to allow users to request creation, editing, and deletion of entitlements, 4) creating policies and any helper objects to grant permission to users to create or approve entitlements appropriate to their role in the organization, 5) optionally, creating any workflows that "backlink" the entitlements to users, groups, roles, or resources, and 6) creating policies and any helper objects to realize these entitlements in connected systems. Additionally, it may be useful to implement reports on entitlement status, using any of several reporting mechanisms that could be implemented with an entitlement management system.

Prior systems attempted to model an entitlement by appending information to a resource representing the user that enumerates what they can do, or to append information to a logical resource (which represents the physical resource) that enumerates who can perform a particular action with respect to that resource, or to a group or role which allows assigning permissions to the group or role as a collection. This typically has one of two deficits: 1) with normal schema depth, it is impossible to persist useful metadata about the entitlement, e.g., when a user became a member of the group, in a way that facilitates application of policy, or reporting, and 2) with deeper schema (for example, where each member of a role has additional data about their membership stored at a deep level in the role object itself), it becomes difficult to use normal tools and techniques to read and write data in a performant way from the sorts of relational and hierarchical databases in which entitlements are typically stored; these databases and their related management tools are not optimized for data structures with this schema depth. The entitlement management system described herein provides a more efficient and flexible facility for managing resource entitlements.

In particular, the expiration date of an entitlement and the policy indicating which users can renew an entitlement can be represented as properties of each entitlement resource, which enables an organization to easily model that entitlements to a resource granted to users in distinct categories expire at different times, and have category-specific requirements for renewal. For example, an organization can define a policy that for a first user, who has a category of "excluded," when an entitlement for that first user to be in a group "Finance FTEs" is created, the properties of that entitlement resource are set to cause the entitlement to expire after one year but that the entitlement can be renewed by that first user. For a second user that does not have the category of "excluded," when an entitlement for the second user to be in the group "Finance FTEs" is created, the properties of that entitlement resource are set to cause the entitlement to expire after three months and the entitlement can only be renewed by the second user's manager. These and many other types of policies are much easier to specify using the data model presented herein.

FIG. 1 is a block diagram that illustrates components of the entitlement management system, in one embodiment. The system 100 includes a user interface component 110, a resource store 120, an entitlement creation component 130, an entitlement expiration component 140, an entitlement renewal component 150, an entitlement synchronization component 160, and an entitlement auditing component 170. Each of these components is described in further detail herein.

In some embodiments, these components may be built into a resource management system that includes a user interface, resource management service, and synchronization service. The resource management service has configuration for entitlement management and is able to manage entitlements in addition to users, groups, roles, and other resources that are normally part of such systems. Configuration for entitlement management enables creation, updating, and deletion of entitlements; and the execution of any workflows needed to 'decorate' some other object (user, group, or role) based on the creation or deletion of an entitlement. The resource management service is responsible for (a) processing requests from users, (b) detecting when time-based workflows (such as renewal and expiration) need to be executed, and (c) executing those workflows. The synchronization service includes the entitlement synchronization component 160 described herein, and is responsible for synchronizing resources to connected systems in which the organization wants to control access by users.

The user interface component 110 provides an interface through which one or more administrators can access the system to create and manage entitlements modeled as resources. The interface may include one or more ways of accessing the system, such as a web-based interface, programmatic application programming interface (API), mobile interface, and so forth. The interface may provide one or more pages or dialogs for creating a new entitlement, reporting on existing entitlements, renewing entitlements, removing entitlements, and so forth.

The resource store 120 is a data store that stores information about each of the resources managed by the system, wherein the resources include one or more entitlements modeled as resources that describe one resource's rights to access another resource. For example, if a user is granted membership to add other users to a mailing list in a directory system (such as MICROSOFT™ WINDOWS™ Active Directory), the entitlement to change membership of the mailing list can itself be stored as a resource. In this way, the lifetime of the resource can be managed to enforce various policies for creation, renewal, expiration, and so forth. In addition, the system can receive workflows associated with modification of the entitlement so that business process logic executes when the entitlement is modified to perform organization-specific steps. The resource store 120 may include one or more files, file systems, hard drives, databases, cloud-based storage services, or other storage facilities for storing data persistently. The other components of the system access and store resources and other data in the resource store 120 for later retrieval.

The entitlement creation component 130 creates an entitlement represented by a resource in the resource store 120. The component 130 may set one or more properties of the entitlement resource, such as the resource's type, duration, members that can modify the resource, an owner of the resource, and so forth. The entitlement creation component 130 may provide an interface exposed by the user interface component 110 through which administrators or other users can access the entitlement creation component 130 to create new entitlements. The component 130 can store created entitlements in the resource store 120 just like any other resource using a resource type that identifies the resource as an entitlement resource. Then, the system 100 can apply any useful processing for handling resources of one or more entitlement types.

The entitlement expiration component 140 handles expiration of entitlements represented by resources. The component 140 may periodically run a process that identifies resources that are due to expire. Upon identifying an expiring resource, the component 140 may remove the resource (or mark it inactive) or execute business process logic, such as a renewal workflow that sends a message to users affected by the expiring entitlement to invite the users to renew the entitlement. The component 140 may allow a set period for users to renew the entitlement before the entitlement is removed. In this way, stale entitlements are not kept in the system 100 but entitlements that are to be retained can be renewed according to a well-defined process that maintains the integrity of the entitlement scheme for the organization.

The entitlement renewal component 150 handles renewal of expiring entitlements. As described above, the system 100 may allow users or other entities to renew an expiring entitlement. The renewal may reset the expiration or other properties of the resource representing the entitlement so that the resource continues to be valid and expires at a new future date. The entitlement renewal component 150 can execute and/or enforce business logic provided by an administrator that structures the conditions for renewal based on a particular organization's entitlement scheme. The entitlement resource may specify which users have access to renew the entitlement, who to notify when the entitlement is at or near expiration, for how long the entitlement is renewed, and so forth.

The entitlement synchronization component 160 synchronizes entitlement resources between multiple environments. IT personnel may model organization changes in a pilot environment and later synchronize those changes to a production environment. In addition, organizations may have many related but separate systems, such as an accounting system, a human resource system, a directory system, and so forth that are affected by changes to entitlements. For example, changes in access permission to an object may involve an update to the directory system, whereas changing a user's name (e.g., due to marriage) may affect many systems in an organization. The entitlement synchronization component 160 allows entitlements modeled as resources in one environment to be copied or synchronized to another environment so that the two environments are harmonized as changes to the entitlement resources occur over time.

The entitlement synchronization component 160 may provide an interface through the user interface component 110, such as a MICROSOFT™ PowerShell cmdlet or other interface through which administrators can export information about resources in various environments, create a change list of differences between two environments, and apply changes to an environment based on the change list of differences with another environment. The entitlement synchronization component can synchronize information to connected systems in an 'on premise' data center environment that is managed by corporate IT staff or outsourced vendors, or a 'cloud' environment where the data center is managed by a service provider.

The entitlement auditing component 170 generates one or more reports that identify entitlements managed by the system 100. The component 170 can generate a report by enumerating resources having a particular entitlement resource type or set of types. Because entitlements are stored as resources, the system can report on the entitlements by status, relationship to other resources, remaining duration, and other criteria. Organizations may have particular auditing or compliance rules that they operate under and the entitlement auditing component 170 provides a way of auditing the state of entitlements within an organization at any particular time. This can allow IT personnel to prove the state of the system 100 with respect to entitlements and give confidence that entitlements are managed in accordance with the organization's entitlement plan.

In some embodiments, the entitlement auditing component 170 supports attestation and certification within organizations. Certification is the process by which (usually) a manager or resource owner certifies that some user or role that has an access entitlement has a business justification to continue having that entitlement. Modeling these entitlements as independent resources provides a convenient mechanism for reporting on the history of requests related to the particular entitlement.

The computing device on which the entitlement management system is implemented may include a central processing unit (e.g., a processor), memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on. The computer system may be running on native hardware, or may be running in a virtualized environment that executes instructions like a physical machine.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
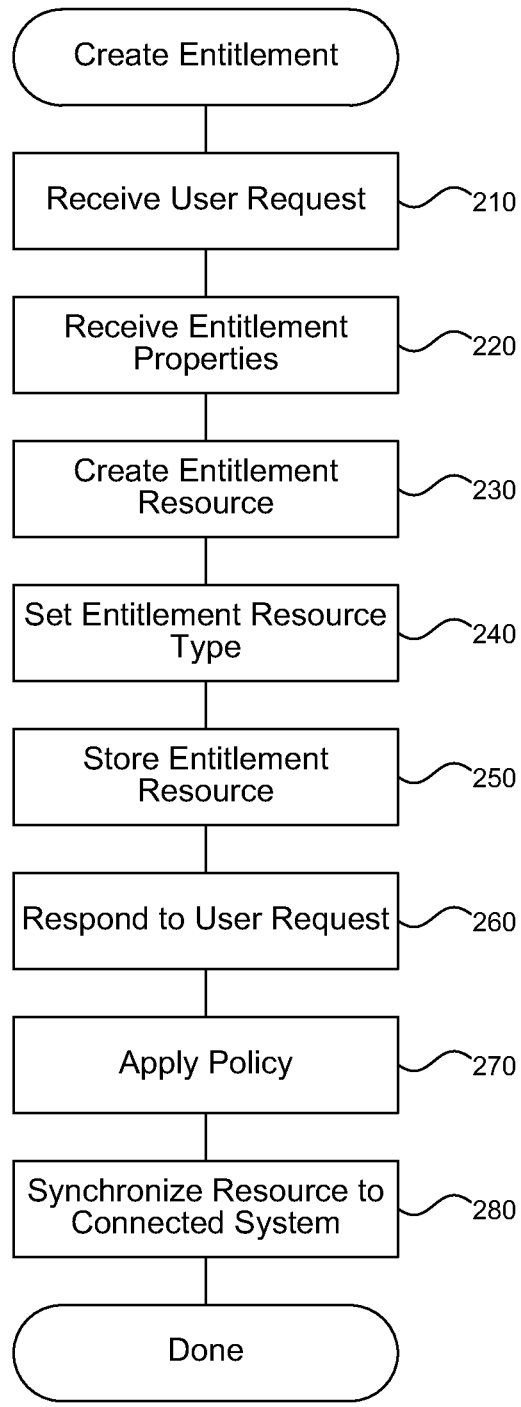
FIG. 2 is a flow diagram that illustrates processing of the entitlement management system to create an entitlement, in one embodiment.

FIG. 2 is a flow diagram that illustrates processing of the entitlement management system to create an entitlement, in one embodiment. Beginning in block 210, the system receives a user request to create a new entitlement related to accessing a target resource. For example, the system may receive the request through a user interface provided by the system for managing entitlements. The entitlement management system may interact with or be implemented within a resource management system that manages resources, such as users, groups, mailing lists, or other objects, for an organization. Entitlements specify access or other rights related to these resources, such as which users can add users to a group, which users can add members to a mailing list, and so forth.

Continuing in block 220, the system receives one or more properties that define a scope of the new entitlement. For example, the properties may specify an owner, a duration of the entitlement, whether the entitlement can be renewed, who can modify the entitlement, a resource type associated with the entitlement, and so forth. The system may extract the properties as parameters from the received request or request additional information from the user to receive the properties.

Continuing in block 230, the system creates an entitlement resource for storing and managing information about the new entitlement. In a resource management system, the entitlement management system may create a resource to represent the entitlement that is stored alongside other types of resources. The system may distinguish the entitlement resource by setting a particular entitlement resource type or specifying other information in association with the entitlement resource. The system may use the resource type to allow reporting related to entitlement or other resources and to allow execution of type-specific business logic.

Continuing in block 240, the system sets an entitlement type on the created entitlement resource that identifies the resource as representing an entitlement. Each resource has a type and entitlement resources are distinguished from other resources by the addition of an entitlement type to the standard body of resources provided by resource management systems.

Continuing in block 250, the system stores the created entitlement resource in a resource store. The resource store stores all of the resources managed by the system and the entitlement is stored in the resource store alongside other types of resources. Because the entitlement is managed as a resource just like other resources, the system can more easily manage the lifetime of the entitlement and providing auditing and reporting functions related to the entitlement.

Continuing in block 260, the system responds to the user request indicating the outcome of creating the new entitlement. For example, the system may provide a new web page in a web interface that indicates that the new entitlement resource was created and that offers the user other interfaces for modifying the created entitlement resource. For example, the user may create the entitlement resource and then set information related to expiration of the entitlement.

Continuing in block 270, the system applies policy to create, update, or delete the resource that the connected system uses as a basis of controlling access or permission, in order to realize the policy intent of the entitlement. For example, if the entitlement refers to a security group and reflects the intent of tracking membership in the security group, then the system may update the security group to add a new member based on the entitlement.

Continuing in block 280, the system synchronizes the resource to a connected system. For example, a connected system may include a directory service, payroll system, human resources system, or other systems running on hardware controlled by the organization, or by a service provider. After block 280, these steps conclude. The synchronization process may be managed by an administrator or performed automatically, such as in a periodic synchronization process.

Modeling entitlements as independent objects in a resource management system is typically idiosyncratic to the resource management system. Because of the entitlements existing in the resource management system, some other type of resource (user, group, or role) generally exists in a particular state in the connected system to which the resource management system synchronizes data. For example, if Alice has an entitlement to be in a group "Finance FTEs," then in Active Directory, Alice would be a member of Finance FTEs. It will typically be convenient for the resource management system to maintain the expected state of the object in the connected system, and synchronize out that state. Therefore, if Alice's entitlement for Finance FTEs expires and is deleted, she would be removed from the group's membership as represented in the resource management system, and then that group would be synchronized out to the connected system so that she is removed there as well.

Figure 3:
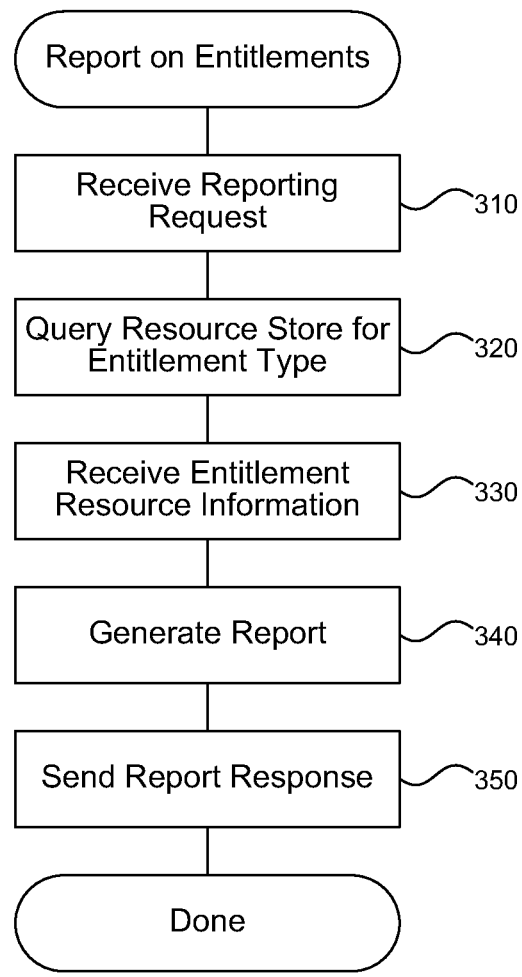
FIG. 3 is a flow diagram that illustrates processing of the entitlement management system to report on entitlements, in one embodiment.

FIG. 3 is a flow diagram that illustrates processing of the entitlement management system to report on entitlements, in one embodiment. Beginning in block 310, the system receives from a requestor a reporting request for auditing one or more entitlements managed by a resource management system. The system may receive the request through a user interface provided to administrators of the system for auditing and monitoring entitlements and other resources associated with an organization, such as a business. IT or other personnel of the organization may periodically run reports on the entitlements in an organization to monitor who has access to what resources and whether the access still satisfies a valid business purpose.

Continuing in block 320, the system queries a resource store for resources having an entitlement type, wherein the system stores entitlements as resources with the entitlement type. Resource management systems are good at storing resources in an organization. By modeling entitlements as resources, the entitlement management system allows the same kind of reporting and modification to occur to entitlement resources as to other resources. By querying by resource type, an administrator can generate a report related to entitlement resources.

Continuing in block 330, the system receives one or more entitlements stored as resources by the system. For example, the query may execute against a resource store, such as a database, and return one or more results (e.g., as rows or another format) that represent entitlements currently stored by the system. The query may specify other criteria to filter the returned entitlements, such as a query to identify expired entitlements or soon-to-expire entitlements.

Continuing in block 340, the system generates a report that includes the received entitlements. The report may include a user interface for display to the requestor, such as a web page, log file, or other report format. The system generates the report by placing the received entitlements in a format for consumption by the requestor. The report may include other entitlement information, such as properties associated with each entitlement returned by the query.

Continuing in block 350, the system sends the generated report to the requestor in response to the request. For example, the system may provide a web interface (e.g., a MICROSOFT™ SHAREPOINT™ portal) through which users can access the system to create reports, and the system may provide a web page in response that includes a table or other format of the data received from the resource management system. Those of ordinary skill in the art will recognize various types of interfaces for receiving query information and providing results in response, such as a graphical user interface (GUI), command-line interface (CUI), programmatic API, and so forth. After block 350, these steps conclude.

In some embodiments, the entitlement management system manages entitlements related to security groups. Security groups in an organization are often created for accessing resources such as file shares, electronic mailboxes, distribution lists, and so forth. Access is granted to such resources by adding users as members to the security groups. The assignment of a user to a group is one type of entitlement, and it may not be the intention of the organization to allow the user to be permanently assigned to the security group. For example, if membership in the security group grants the user access to sensitive information, the organization may want to limit the duration during which users have access to the information, or may at least want to formalize access to the information so that access rights are periodically reviewed.

Using the entitlement management system, an administrator can create a resource that represents this entitlement. For example, the system may extend the schema of FIM to include types for entitlement resources. An access entitlement resource type can include properties related to the entitlement, such as an expiration date. In addition, the resource definition may include one or more properties that facilitate the management of the entitlement resource, such as the policies that apply to the entitlement, or the control frameworks to which the entitlement is subject. As the entitlement nears expiration, the system can provide notifications to users, such as to renew the entitlement. When the entitlement is deleted, such as when a user is removed from a security group due to expiration of the entitlement, the deletion can trigger a workflow or other business logic, such as to notify the user or a security group owner. This provides a well-defined, tightly managed process for handling entitlements in an organization. Expiration of entitlements related to security groups can reduce the common problem of token bloat for security groups in Active Directory, which occurs when a user accumulates membership in many security groups unnecessarily over time, and can result in delays or other problems in authenticating to the directory.

The system can also manage other resources in addition to security groups. Any set that creates resource rights or handles access to a resource can be modeled as a resource entitlement. For example, an SAP payroll analyst role in an organization may provide users access to perform payroll functions in an organization. The system can manage entitlements related to these and other types of external systems, just as other resources are managed by resource management systems today. Attributes of resources can also be tracked in this way. For example, an attribute "isExecutive" that specifies that a company employee is part of the executive team with access to sensitive corporate information can be assigned to users and managed as an entitlement resource so that the attribute expires and/or is checked for renewal periodically.

In some embodiments, the entitlement management system allows specification of who can renew an entitlement. The system may store one or more properties related to renewal with the entitlement resource, and the properties may specify who can renew the entitlement. For example, in a particular organization renewal may be handled by the user himself that seeks renewal, by the user's manager, by an owner of the resource to which the user has/wants access, by a particular organizational position (e.g., VP-level approval), and so forth.

In some embodiments, the entitlement management system creates an audit trail for discovering information about entitlements that was difficult in previous systems. For example, the system allows determination of who created an entitlement, what the original criteria/basis for creating the entitlement were, when each user was given access to a resource, what policies were applied to creation and renewal of the entitlement, and so forth. Because resource management systems already track actions related to resources, modeling entitlements as resources provides similar trackability to entitlements. In a world where corporate accountability and auditability of information is increasingly expected, this provides verification of compliance with respect to resource entitlements.

From the foregoing, it will be appreciated that specific embodiments of the entitlement management system have been described herein for purposes of illustration, but that various modifications may be made without deviating from the spirit and scope of the invention. Accordingly, the invention is not limited except as by the appended claims.

We claim:

1. A computer-implemented method for creating an entitlement resource in a resource management system, the method comprising:
    receiving a user request to create a new entitlement related to accessing a target resource;
    receiving one or more properties that define a scope of the new entitlement;
    creating an entitlement resource for storing and managing information about the new entitlement, wherein each entitlement is created with an expiration date after which the entitlement will be automatically removed without additional user intervention;
    setting an entitlement type on the created entitlement resource that identifies the resource as representing an entitlement;
    storing the created entitlement resource in a resource store of the resource management system;
    responding to the user request indicating the outcome of creating the new entitlement;
    applying policy to create, update, or delete the resource which the connected system uses as a basis of controlling access or permission, in order to realize the policy intent of the entitlement; and
    synchronizing the resource to a connected system,
    wherein the preceding steps are performed by at least one processor.

2. The method of claim 1 wherein receiving the request comprises receiving the request through a user interface provided by the system for managing entitlements.

3. The method of claim 1 wherein receiving one or more properties comprises receiving a duration of the entitlement, after which the entitlement expires if the entitlement is not renewed, and further comprising, upon expiration of the entitlement, disabling or revoking access to the target resource.

4. The method of claim 1 wherein receiving one or more properties comprises receiving a resource type associated with the entitlement that identifies the resource as an entitlement.

5. The method of claim 1 wherein receiving one or more properties comprises extracting the properties as parameters from the received request.

6. The method of claim 1 wherein receiving one or more properties comprises receiving a workflow associated with the entitlement that is executed upon a particular action taken related to the entitlement.

7. The method of claim 1 wherein creating the entitlement resource comprises creating a resource to represent the entitlement that is stored alongside other types of resources in the resource management system.

8. The method of claim 1 wherein creating the entitlement resource comprises distinguishing the entitlement resource from other resources managed by the system by setting the entitlement resource type.

9. The method of claim 1 wherein storing the entitlement resource comprises storing the entitlement resource alongside other resource types managed by the resource management system so that entitlements can be tracked and reported on like other resource types.

10. The method of claim 1 wherein storing the entitlement resource comprises storing the entitlement resource alongside other resource types managed by the resource management system to allow the system to automatically manage the entitlement life cycle.

11. The method of claim 1 further comprising synchronizing the stored entitlement resource with another environment in an organization that is affected by the new entitlement.

12. A computer system for entitlement lifecycle management in an organization, the system comprising:
a processor and memory configured to execute software instructions embodied by the following components;
a user interface component configured to provide an interface through which one or more administrators can access the system to create and manage entitlements modeled as resources, wherein an entitlement describes access rights of one resource with respect to another resource, and wherein each entitlement is created with an expiration date after which the entitlement will be automatically removed without additional user intervention;
a resource store configured to store information describing each of the resources managed by the system, wherein the resources include one or more entitlements modeled as resources that describe one resource's rights to access another resource;
an entitlement creation component configured to create an entitlement represented by a resource in the resource store;
an entitlement expiration component configured to handle expiration of entitlements represented by resources;
an entitlement renewal component configured to handle renewal of expiring entitlements;
an entitlement synchronization component configured to synchronize entitlement resources between multiple environments within the organization; and
an entitlement auditing component configured to generate one or more reports that identify entitlements managed by the system.

13. The system of claim 12 wherein the processor and memory execute the software instructions within a virtual machine environment that emulates a physical machine.

14. The system of claim 12 wherein the resource store is further configured to store one or more workflows associated with each entitlement resource, wherein the workflows specify business logic to be executed upon an occurrence of an event related to an entitlement resource.

15. The system of claim 12 wherein the entitlement creation component is further configured to set one or more properties of the entitlement resource, wherein the properties include at least a resource type that identifies the resource as an entitlement resource.

16. The system of claim 12 wherein the entitlement creation component is further configured to provide an interface exposed by the user interface component through which administrators or other users can access the entitlement creation component to create new entitlements.

17. The system of claim 12 wherein the entitlement expiration component is further configured to periodically run a process that identifies entitlement resources that are due to expire, and, upon identifying an expiring entitlement resource, to remove the entitlement and inform a related connected system to remove one resource's rights to access another resource.

18. The system of claim 12 wherein the entitlement expiration component is further configured to periodically run a process that identifies entitlement resources that are due to expire, and, upon identifying an expiring entitlement resource, to execute business process logic for handling the expiring entitlement.

19. The system of claim 12 wherein the entitlement renewal component is further configured to handle entitlement renewal by sending a notification to a user in the organization indicating the expiring entitlement and offering the user an option to renew the entitlement for a duration.

20. A computer-readable storage device comprising instructions for controlling a computer system to report on entitlements managed by a resource management system, wherein the instructions, upon execution, cause a processor to perform actions comprising:
receiving from a requestor a reporting request for auditing one or more entitlements managed by the resource management system, wherein each entitlement is created with an expiration date after which the entitlement will be automatically removed without additional user intervention;
querying a resource store for resources having an entitlement type, wherein the system stores entitlements as resources with the entitlement type;
receiving one or more entitlements stored as resources by the system;
generating a report that includes the received entitlements; and
sending the generated report to the requestor in response to the request.

* * * * *